(12) United States Patent
Yoshida et al.

(10) Patent No.: US 6,203,938 B1
(45) Date of Patent: Mar. 20, 2001

(54) FLAT CELLS

(75) Inventors: Toshio Yoshida, Hyogo; Kazuo Omine, Osaka, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/357,790

(22) Filed: Jul. 21, 1999

(30) Foreign Application Priority Data

Jul. 21, 1998 (JP) .................................................. 10-204656

(51) Int. Cl.⁷ .................................................. H01M 10/40
(52) U.S. Cl. ........................ 429/94; 429/162; 429/218.1; 429/245
(58) Field of Search ............................. 429/94, 209, 233, 429/162, 245, 218.1; H01M 6/10

(56) References Cited

U.S. PATENT DOCUMENTS 5,487,961 * 1/1996 Strangeways et al. .

FOREIGN PATENT DOCUMENTS 60-133655 * 7/1985 (JP) .

0-5041211 * 2/1993 (JP) .

* cited by examiner

Primary Examiner—John S. Maples
(74) Attorney, Agent, or Firm—Ratner & Prestia

(57) ABSTRACT

The present invention provides a flat cell that employs strip-shaped electrode plates on which an active material layer has been formed by coating paste or by electrolytic deposition on both sides or one side of a core material consisting of a metal foil. By constructing an electrode group having an oval cross section by spirally winding in a manner folding, a strip-shaped positive plate having a striped recessed portion of a predetermined width of which the center is positioned on the line of folding formed on the active material layer at least the inner side of at least the inner-most folded portion close to a core portion, and a strip-shaped negative plate with a separator interposed, reduction in the battery capacity due to breakage of the electrode plates and/or peeling off and dropping of the active material layers and failure due to internal short circuit as has previously been caused when assembling an electrode group having an oval cross section can be completely eliminated, thus drastically improving the reliability of flat cells, especially flat type lithium-ion secondary batteries.

10 Claims, 3 Drawing Sheets

FLAT CELLS

FIELD OF THE INVENTION

The present invention relates to a thin-type flat cell in which an electrode group having an oval cross section configured by spirally winding, one each of a strip-shaped positive plate and a strip-shaped negative plate with a separator interposed, is housed. In particular, the invention relaters to a flat cell which is free from failure, due to breakage of electrode plates and/or peeling off or dropping of the active material when assembling the electrode group, by a preliminary processing of the portion of the electrode plates to be folded.

BACKGROUND OF THE INVENTION

In association with the trend toward smaller-size, lighter-weight, and thinner design of portable equipment, as represented by portable telephone, note-book type personal computers, and camcorders, there has been remarkable progress in recent years in the small-size secondary batteries to be used as the power source of such equipment. Following the initially commercialized conventional type lead-acid system and nickel-cadmium system, new types of nickel-metal hydride systems and lithium-ion systems with higher energy densities have recently been commercialized.

With small-size sealed lead-acid batteries, rectangular batteries are the generally adopted configuration. In such batteries, the electrode groups are constructed by alternately stacking a plurality of positive plates and negative plates with a separator interposed and connecting together the electrode plates of the same polarity. The groups of electrodes then are encased in a 3-cell or 6-cell mono-block type plastic battery container, and are sealed after being connected in series.

Nickel-cadmium batteries and nickel-metal hydride batteries are used in the form of a battery pack in which a plurality of either cylindrical cells, obtained by encasing and sealing an electrode group constructed by spirally winding one each of strip-shaped positive plate and strip-shaped negative plate with a separator interposed in a metallic cell container, or rectangular cells, obtained by encasing and sealing an electrode group constructed by alternately stacking a plurality of positive plates and negative plates with a separator interposed and connecting together the electrode plates of the same polarity in a metallic container, are connected in series and/or in parallel in order to obtain a required voltage and capacity.

With lithium-ion secondary batteries, cylindrical cells are constructed in basically the same way as the nickel-cadmium system batteries and nickel-metal hydride system batteries. In contrast to this, with thin type flat cells having a rectangular or oval cross section and which are regarded important from the standpoints of thinning appliances and reducing dead space of the power source, because the thicknesses of the positive and negative plates and the separator are extremely small, a cell configuration is adopted in which an electrode group is constructed by spirally winding one each of strip-shaped positive and negative plates with a separator interposed in such a manner that they are folded to make the cross section oval in shape. The electrode groups are encased in a container, and sealed after pouring and impregnating with an electrolyte.

In order to further make this type of a cell thinner or higher in capacity, the core material of the electrode plates is made as thin as possible and the amount of the separator in the core portion and the outermost portion of the electrode group is reduced, or the thickness of the electrode group is made smaller by applying a higher pressure to the electrode group when it is inserted and encased in a cell container.

On the other hand, in order to fabricate such an electrode group with a high productivity, a core portion is formed as a first step by winding a separator while keeping it firmly held on a mandrel, a coil one each of strip-shaped positive plate and negative plate is spirally wound with the separator interposed, and the outer surface is fixed by wrapping with an extra length of the separator, thereby completing an electrode group having an elliptical cross section. As a second step, a process is carried out in which the electrode group is pressed and deformed while being sandwiched between a pair of flat plates which are parallel to the major axis of the electrode group and have an elliptical cross section, thereby producing an electrode group having an oval cross section as shown in FIG. 1. FIG. 1 is an enlarged cross-sectional view of an essential part of an electrode group 1 of a thin-type lithium-ion secondary flat cell. In FIG. 1, the electrode group 1 is constructed by spirally winding one each of strip-shaped positive plate 11 and negative plate 12 in such a way that they are folded with a separator 13 interposed. The electrode group 1 is made by first spirally winding the positive plate 11 and the negative plate 12 with the separator 13 interposed enwrapping a core portion 13a which is made by folding over the tip of one end of the separator 13. The separator 13 enwraps the outside of the electrode group 1, and the tip 13b of the other end of the separator is tightly fastened to the electrode group 1 by a heat-sealing method or the like.

In the final process of pressing and deforming in the second step of constructing an electrode group, breakage of an electrode plate sometimes takes place because of tearing off of the core material of the electrode plate at the innermost folded portion 11a of the positive plate 11 close to the core portion 13a and the subsequent folded portion 11a', and at the innermost folded portion 12a and subsequent folded portion 12a' of the negative plate 12, thus causing a reduction in the cell capacity. Also, even when an electrode plate is not broken, the active material layer sometimes peels off from the core material, leading to dropping of small portions of the active material layer, thus damaging the separator and causing internal short circuits between the positive and negative electrodes, resulting in a loss of reliability in the lithium-ion secondary batteries employing an organic electrolyte. Consequently, it is critically important to totally prevent such breakage of electrode plates and/or peeling off and dropping of the active material layer. Many of such failures tend to take place with the positive plate which has a relatively higher filling density of the active material layer than the negative plate and which uses as the core material of the electrode plate aluminum which has a relatively lower tensile strength and repetitive bending strength than the copper foil used as the core material of the negative plate. Also, the failures tend to take place on the innermost folded portion which is close to the core portion.

FIG. 2 is a plan view of a folded portion of a strip-shaped positive plate of an electrode group having an oval cross section as constructed in the final step. In FIG. 2, breakage and/or peeling off and dropping of the active material layer tends to take place at the innermost folded portion 11a of the positive plate 11 which is close to the core portion. Occasionally, breakage of the positive plate and/or peeling off and dropping of the active material layer takes place at the folded portion 11a' which is next to the innermost folded portion 11a. No breakage of the positive plate or peeling off and dropping of the active material layer takes place in the subsequent folded portion 11a" (corresponding to the outer region of the innermost folded portion 11a). Reference numeral 11b is a positive plate lead tab made of aluminum onto which an insulating tape 11c is affixed.

FIG. 3 is an enlarged cross-sectional view of the core portion and its outer regions only of an electrode group having an oval cross section. In FIG. 3, the negative plate 12, which is adjacent to the core portion 13a consisting of a separator 13 that separates the positive plate 11 and the negative plate 12, comprises a core material 12d consisting of a copper foil onto both sides of which active material layers 12e and 12f, mainly consisting of carbon material, are coated. At very rare intervals, peeling off and dropping of the active material layer 12e' on the inner side of the innermost folded portion of the negative plate have been observed. Compared with this negative plate, the positive plate 11 comprises a core material 11d consisting of an aluminum foil onto both sides of which active material layers 11e and 11f, mainly consisting of lithium cobaltate ($LiCoO_2$), are coated. Even though the positive plate 11 has been placed on the outside of the innermost negative plate 12 with the separator 13 interposed, many instances of peeling off and dropping of the active material layer 11e' on the inner side and the active material layer 11f' on the outer side have been observed at the initial folded portion, and breakage of the positive plate 11 has taken place due to tearing of the core material 11d at the folded portion.

In order to prevent the above-described failure due to breakage of the electrode plate and/or peeling off and dropping of the active material layers, measures such as increasing the thickness of the core material of the electrode plate, increasing the radius of curvature of the folded portion of the electrode plate by making the core portion consisting of the separator of the electrode group, or preliminarily removing the active material layers in the vicinity of the folded portion of the electrode plates have been suggested. However, each such measure inevitably leads to a reduction in the battery capacity, and is not an appropriate approach for a new type of battery aiming at achieving higher energy densities.

Japanese Laid-Open Patent Applications No. Sho 60-133655 and No. Hei 5-41211 disclose a cylindrical cell in which a coil-shaped electrode group is constructed by forming parallel grooves in the direction perpendicular to the direction of spirally winding a foamed electrode plate obtained by filling an active material onto a spongy nickel sheet or a paste type electrode plate in which active material paste has been coated on a core material and dried.

However, no proposal has heretofore been made which is effective to suppress failures due to breakage of electrode plates and/or peeling off and dropping of the active material layers when constructing an electrode group having an oval cross section for a thin type flat cell comprising strip-shaped positive and negative plates that use a foil-form core material and a separator.

SUMMARY OF THE INVENTION

The present invention provides a flat cell employing strip-shaped electrode plates on which an active material layer has been formed by either coating paste or by electrolytic deposition on both sides or one side of a core material consisting of a metal foil, and having an electrode group having an oval cross section constructed by spirally winding one each of strip-shaped positive plate and negative plate in which a striped recessed portion having a predetermined width of which the center is positioned on the line of folding has been formed in advance on at least the inner side of the active material layer of at least the inner-most folded portion close to the core portion in such a manner that the positive and negative plates are folded with a separator interposed.

By employing such a structure, breakage of the electrode plate and/or peeling off and dropping of the active material layers which took place during the conventional process of constructing an electrode group having an oval cross section are completely suppressed, reduction in cell capacity and failure due to internal short circuit are totally prevented, thus drastically improving reliability of flat cells, especially flat-type lithium-ion secondary batteries.

DETAILED DESCRIPTION OF THE PREFERRED EMBODIMENTS

Referring to drawings and a table, a detailed description of the present invention will be given with respect to exemplary embodiments.

Figure 1:
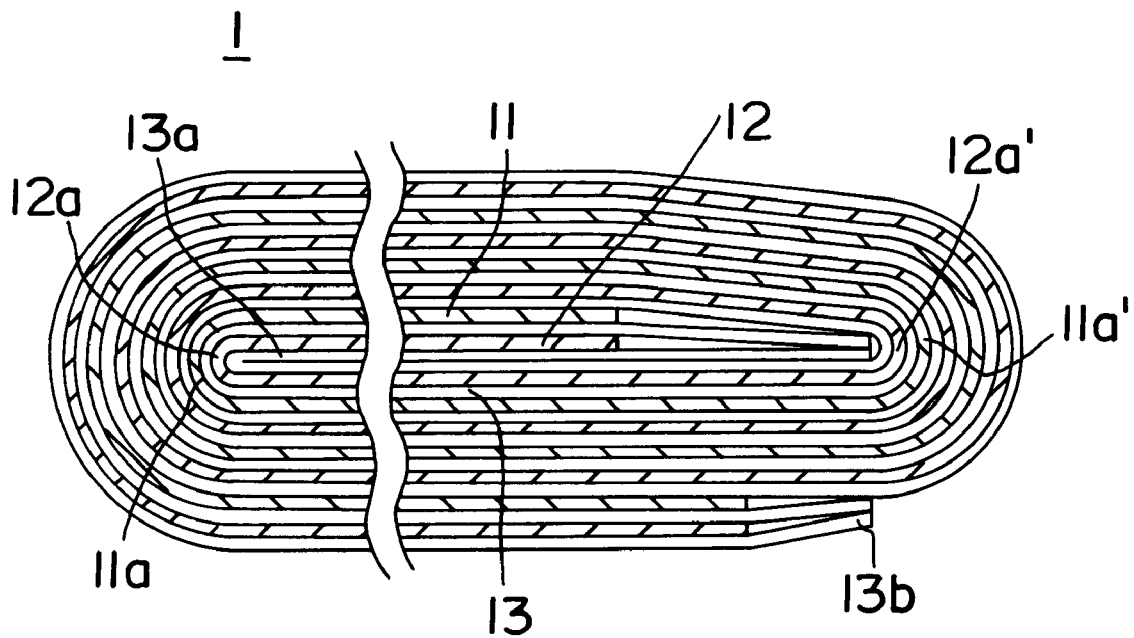
FIG. 1 is an enlarged cross-sectional view of an essential part of an electrode group of a flat-type lithium-ion secondary cell.
Figure 2:
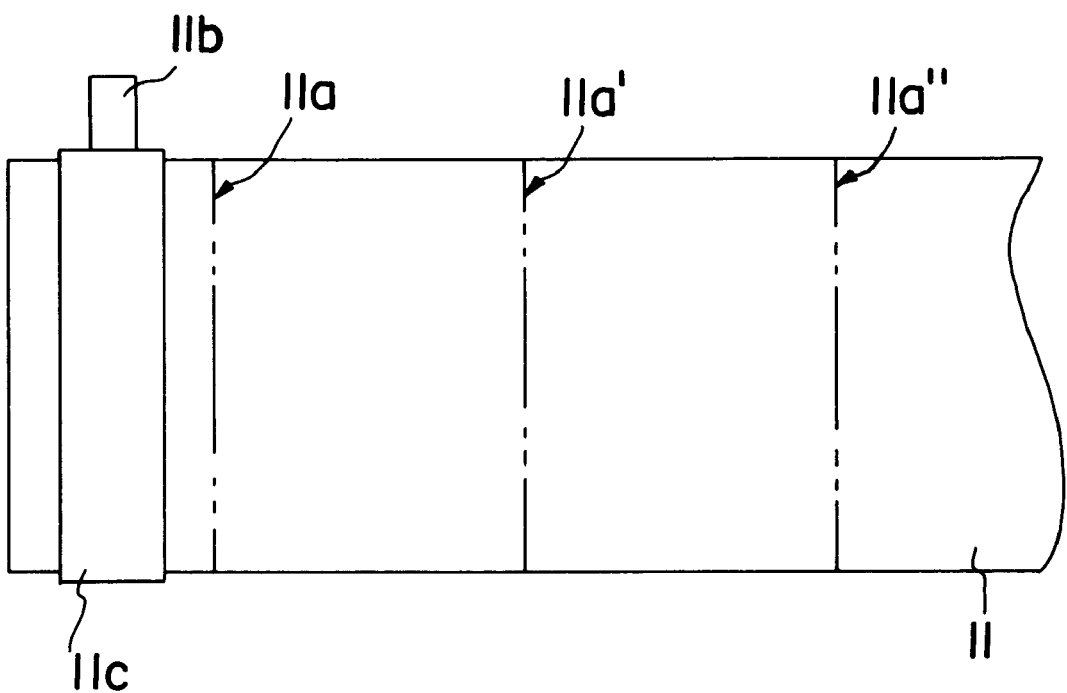
FIG. 2 is a plan view of a folded portion of a strip-shaped positive plate when an electrode group having an oval cross section is constructed.
Figure 3:
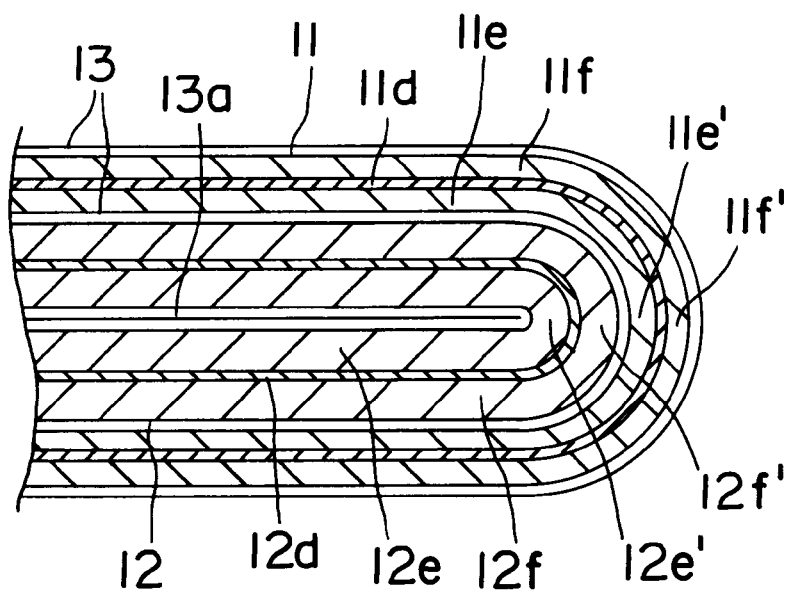
FIG. 3 is an enlarged view of the core portion and its outer regions only of the electrode group having an oval cross section.
Figure 4:
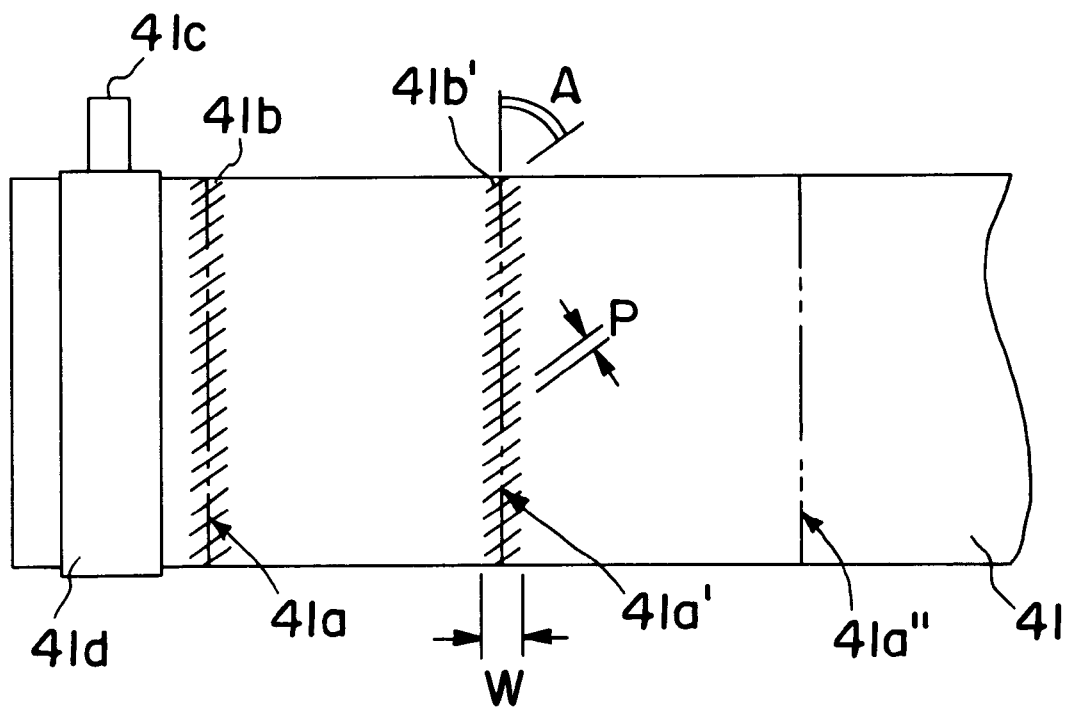
FIG. 4 is a plan view illustrating an example of formation, in advance, of striped recessed portions, having a predetermined width of which the center is positioned on the line of folding, on the inner side of the innermost and subsequent folded portions of the strip-shaped positive plate in accordance with the present invention.
Figure 5:
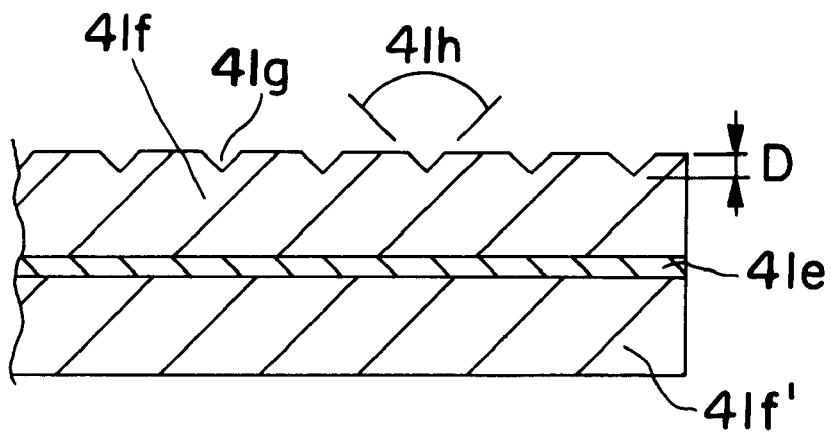
FIG. 5 is an enlarged cross-sectional view of an example of striped recessed portions formed in advance on the folding portions of the positive plate in accordance with the present invention.

Exemplary Embodiment 1:

Positive electrode paste was prepared by adding to 50 parts by weight of lithium cobaltate ($LiCoO_2$) powder as a positive material, 1.5 parts by weight of acetylene black as an electric conductor, 7 parts by weight of 50 wt % polytetrafluoroethylene (PTFE) dispersion solution as a binder, and 41.5 parts by weight of 1 wt % ammonium carboxymethylcellulose aqueous solution as a thickener, and kneading. After coating the positive electrode paste to a thickness of 0.35 mm using a die coater onto both sides of a core material consisting of an aluminum foil 20 $\mu$m in thickness and drying, PTFE particles in the binder were sintered by heating at 200° to 300° C. A strip-shaped positive plate was obtained by subsequently rolling to a thickness of 0.18 mm and cutting to predetermined dimensions. As shown in FIG. 4 and FIG. 5, the positive plate 41 was coated with active material layers 41f and 41f' on both sides of a core material 41e consisting of aluminum foil. Striped recessed portions 41b and 41b', extending 1.0 mm each to the left and right (total width 2.0 mm) from the line of folding of the folded portions indicated by 41a and 41a' out of the innermost folded portion 41a of the positive plate 41 close to the core material, the subsequent folded portion 41a', and further subsequent folded portion 41a41 (corresponding to the folded portion on the outside of the inner-most folded portion 41a), were formed on the inner side of the active material layer 41f of the folded portion. The depth D of these striped recessed portions is 0.05 mm, which is equal to 62.5% of the thickness 0.08 mm of the active material layer of the positive plate. The striped recessed portions are stripes having a V-shaped cross section with an angle 41h of 60°. The pitch p of the stripes is 0.75 mm and the angle A relative to the line of folding is made to be 45°. In forming these striped recessed portions 41b and 41b', striped convex portions of a predetermined pitch, angle and height were formed by a knurling process on the outer surface of a roller 2.0 mm in width, and then the roller was rolled under a pressure on top of the predetermined folding portions. An aluminum lead tab 41c was welded to the positive plate on which these striped recessed portions had been formed, and the welded portion was covered with an insulating tape 41d.

On the other hand, a strip-shaped negative plate was obtained by coating negative electrode paste prepared by adding to 100 parts by weight of graphite powder, 5 parts by weight of a binder solution consisting of styrene-butadiene co-polymer and kneading onto both sides of a core material consisting of a copper foil 10 μm in thickness by using a die coater, drying, rolling to a thickness of 0.15 mm, and cutting to predetermined dimensions. A lead tab made of nickel was welded to the negative plate, and the welded portion was covered with an insulating tape.

As the separator, a micro-porous polyethylene membrane with a thickness of 27 μm was used.

As a first step, an electrode group having an elliptical cross section was constructed by nipping one tip of the separator in a slit 62 of a mandrel 61 (refer to FIG. 6) having an elliptical cross section and being provided with a slit on its minor axis, winding the separator on the outer surface of the mandrel by turning the mandrel, and spirally winding one each of positive and negative plates with the separator interposed. After enwrapping the outer surface of the electrode group with the separator, the electrode group was tightly fastened by heat-sealing the other tip of the separator. The electrode group was then taken out from the mandrel under this condition and was pressed and deformed under a pressure of 50 kgf/cm² while being sandwiched between a pair of flat plates which are parallel to the major axis of the electrode group to obtain an electrode group having an oval cross section. Subsequently, the electrode group was inserted into a nickel-plated steel cell container having an oval cross section, followed by laser welding a positive electrode tab on a positive terminal made of aluminum provided on the cover, and connecting a negative electrode tab by resistance welding to a nickel-plated steel frame previously secured by welding on the upper periphery of the cell container. A flat cell was completed by subsequently pouring and impregnating with a predetermined quantity of an organic electrolyte and sealing the cover and the upper periphery of the cell container by laser welding.

As the organic electrolyte, a solution obtained by dissolving 30 vol % ethylene carbonate, 50 vol % diethyl carbonate, and 20 vol % methyl propionate into a mixed solvent of anhydride lithium hexafluorophosphate ($LiPF_6$) to a concentration of 1 mol/l was used.

Exemplary Embodiment 2:

A positive plate and a negative plate were made in the same manner as in Exemplary Embodiment 1, and striped recessed portions were formed in advance on both sides of the innermost folded portion close to the core portion. These striped recessed portions extended to 2.0 mm each to the left and right (total width 4.0 mm) of the line of folding of the folded portion and were 0.02 mm in depth which is equal to 25.0% of the thickness 0.08 mm of the active material layer of the positive plate and 28.6% of the thickness 0.07 mm of the active material layer of the negative plate. The striped recessed portions were stripes having a V-shaped cross section with an angle of 100°, inter-stripe pitch of 2.0 mm, and the angle of the stripes relative to the line of folding was chosen to be 90°.

By way of comparison, prior art examples of positive and negative plates were separately prepared in which striped recessed portions had not been formed in advance, differently from the Exemplary Embodiment 1 and Exemplary Embodiment 2 of the present invention, on the active material layer on the inner side of the innermost folded portion close to the core portion of the positive plate, and on the active material layers on both sides of the innermost folded portion of the positive and negative plates close to the core portion. Using the positive plates and negative plates of the Exemplary Embodiment 2 and the prior art example, flat cells were fabricated in the same manner as in Exemplary Embodiment 1. The separators, compositions of the liquid electrolytes, and the cell assembling conditions were exactly the same as in Exemplary Embodiment 1.

Table 1 shows results of comparison of 1000 cells each of Exemplary Embodiment 1, Exemplary Embodiment 2, and the prior art example as for reduction in the cell capacity due to breakage of electrode plates and/or peeling off and dropping of the active material layers and failure rates due to internal short circuit when constructing electrode groups.

TABLE 1

| Pattern of striped recessed portion | Embod. 1 | Embod. 2 | Prior Art |
| --- | --- | --- | --- |
| Total width (mm) | 2.0 | 4.0 | — |
| Depth (mm) | 0.05 | 0.02 | — |
| Angle of V-shaped recess (°) | 60 | 100 | — |
| Angle to line of folding (°) | 45 | 90 | — |
| Inter-stripe pitch (mm) | 0.75 | 2.0 | — |
| Electrode plates formed | + | +, − | — |
| Side of recess formation | Inner side | Both sides | — |
| Failure rate (%) | 0 | 0 | 0.20 |

In Exemplary Embodiment 1, while an example was shown of forming striped recessed portions on the active material layer on the inner side of the innermost and subsequent folded portions of the positive plate close to the core portion, a study was separately made of forming a striped recessed portion on the active material layer on the inner side of the innermost folded portion only of the positive plate close to the core portion. The scale of trial was of the same level of 1000 cells and the rate of failure was also zero. In Exemplary Embodiment 2, although an example of forming striped recessed portions on both sides of the innermost folded portion close to the core portion for both of the positive and negative plates was described, it was confirmed that equal effect had been obtained by forming a striped recessed portion on the inner side only.

Accordingly, it is an essential condition of the present invention to form a striped recessed portion at least on the active material layer on the inner side of the innermost folded portion close to the core portion of the positive plate which uses aluminum as the core material. In order to assure a higher reliability, it is preferable to form a striped recessed portion on the positive plate not only on the active material layer on the innermost folded portion close to the core portion but also on the active material layer on at least the inner side of the subsequent folded portion, and furthermore to form striped recessed portions on the negative plate on at least the inner side of the active material layers on the innermost folded portion close to the core portion and the subsequent folded portion.

There is more harm than good to press the entire recessed portion formed on the active material layer on the inner side or both sides of the folded portion of the positive and negative plates. This is presumably because the density of the recessed part of the active material layers becomes too high, and the active material layers become easy to peel off from the core material, or the core material becomes easy to tear when folding the electrode plate. Also, when the inter-stripe pitch is made excessively small, it is not effective as in the case of pressing the entire recessed portion. Furthermore, it may be easily understood that the striped recessed portions parallel to the line of folding will not have effect when the pitch is increased.

The appropriate range of the angle of the V-shaped cross section of the striped recessed portion is between 30° and 120°. When the depth is too shallow relative to the thickness of the active material layer on one side of the core material, the striped recessed portion is not effective; when it is too deep, there is more harm than good as the active material layer peels off when forming the recessed portion. The appropriate range of the depth is between 20% and 70% of the thickness of the active material layer.

The appropriate range of width of the striped recessed portion is between 0.5 mm and 3.0 mm each to the left and right from the line of folding (range of total width being 1.0 to 6.0 mm), and the inter-stripe pitch is chosen from the range between 0.5 mm and 5.0 mm.

The configuration, depth, and pitch of the V-shaped striped recessed portion can be observed with an optical microscope after submerging the electrode plate into epoxy resin, curing after de-aeration, cutting, and polishing.

Although a cell container having an oval cross-section was used in the Exemplary Embodiments of the present invention, a cell container having a rectangular cross section may be used to increase the quantity of the electrolyte solution. In sealing the cell container and the cover, not only laser welding employed in the Exemplary Embodiments but also caulking may be employed with a gasket interposed.

In the Exemplary Embodiments, although a description was given on a lithium-ion secondary battery having a positive plate using $LiCoO_2$ as the active material, the present invention is not limited to this positive active material. It is equally applicable to a positive plate using lithium-containing double oxides such as lithium nickelate ($LiNiO_2$) and spinel type lithium manganate ($LiMn_2O_4$). Needless to say, the present invention is not only applicable to lithium-ion secondary batteries using an organic liquid electrolyte but also to primary and secondary batteries using a non-aqueous electrolyte such as polymer electrolyte. Furthermore, in nickel-cadmium and nickel-metal hydride systems, for instance, the present invention is equally applicable to strip-shaped electrode plates formed by coating paste or electrolytic deposition of an active material on both sides or one side of a core material consisting of a nickel foil or nickel-plated steel foil.

Figure 6:
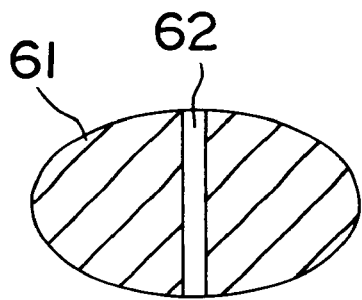
FIG. 6 and FIG. 7 are cross-sectional views of examples of mandrels for constructing an electrode group having an elliptical cross section prior to constructing an electrode group having an oval cross section in accordance with the present invention.
Figure 7:
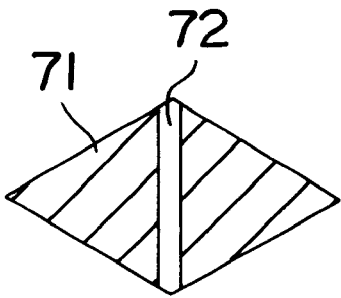

Prior to constructing an electrode group having an oval cross-section in accordance with the present invention, though a mandrel having an elliptical cross section as shown in FIG. 6 was used in the Exemplary Embodiments as the first step of making an electrode group having an elliptical cross section by spirally winding one each of positive and negative plates with a separator interposed, it is extremely effective to use a lozenge-shaped mandrel as shown in FIG. 7. It has the advantage of allowing not only to spirally wind accurately without idling but also to construct a precise electrode group without leaving a useless space in the core portion.

As has been set forth above in detail, the present invention has an extremely high industrial value of providing drastic improvement of reliability of various types of flat cells by totally eliminating a reduction in battery capacity due to breakage of electrode plates and/or peeling off and dropping of the active material layers and failure due to internal short-circuit which previously took place when constructing an electrode group having an oval cross-section by spirally winding, with an interposed separator, strip-shaped positive and negative plates on which an active material layer has been formed by either coating paste or by electrolytic deposition on both sides or one side of a core material consisting of a metal foil in such a manner that they are folded.

What is claimed is:

1. A flat cell with an electrode group having an oval cross section wherein:
   (a) a strip-shaped positive plate on which a striped recessed portion in the form of stripe having a V-shaped cross section having an angle in the range of 30° to 120° and a predetermined width centered on a line of folding is formed on an active material layer on an inner side of at least an innermost folded portion close to a core portion, and
   (b) a strip-shaped negative plate
   are spirally wound with a separator interposed in such a manner that said strip-shaped positive plate and said strip shaped negative plate are folded.

2. The flat cell of claim 1 wherein a width of the striped recessed portion is in the range 0.5 mm to 3.0 mm each to the left and right from the line of folding.

3. The flat cell of claim 1 wherein the depth of the striped recessed portion is in the range 20% to 70% of a thickness of the active material layer.

4. The flat cell of claim 1 wherein an inter-stripe pitch is in the range of 0.5 mm to 5.0 mm.

5. The flat cell of claim 1 wherein a striped recessed portion is formed on not only a positive electrode plate but also the negative electrode plate.

6. The flat cell of claim 1 wherein a strip-shaped electrode plate comprises:
   an active material layer wherein said active material layer is formed by coating paste or by electrolytic deposition on both sides or one side of a core material consisting of a metal foil is used.

7. The flat cell of claim 1 comprising a positive plate on which an active material layer mainly comprising a lithium-containing double oxide has been formed on both sides or one side of a core material consisting of an aluminum foil and a non-aqueous electrolyte.

8. The flat cell of claims 7, wherein said lithium-containing double oxide is selected from the group including lithium cobaltate, lithium nickelate, and spinel type lithium manganate.

9. The flat cell of claim 7, wherein said non-aqueous electrolyte is selected from the group including organic electrolyte and polymer electrolyte.

10. A flat cell with an electrode group having an oval cross section wherein:
(a) a strip-shaped positive plate on which a striped recessed portion having a depth (D) of 0.05 mm and a predetermined width centered on a line of folding is formed on an active material layer on an inner side of at least an innermost folded portion close to a core portion, and
(b) a strip-shaped negative plate are spirally wound with a separator interposed in such a manner that said positive plate and said negative plate are folded.

* * * * *